United States Patent
Dayal et al.

(10) Patent No.: US 8,688,537 B2
(45) Date of Patent: Apr. 1, 2014

(54) MAINTENANCE OF A COMPANY PROFILE OF A COMPANY ASSOCIATED WITH A SUPPLIER/BUYER COMMERCE NETWORK

(75) Inventors: Kshitij Dayal, San Jose, CA (US); Jonathan Rosen, Sunnyvale, CA (US); Robert Mihalko, Sunnyvale, CA (US); Bhaskar Himatsingka, Sunnyvale, CA (US)

(73) Assignee: Ariba, Inc., Sunnyvale, CA (US)

( * ) Notice: Subject to any disclaimer, the term of this patent is extended or adjusted under 35 U.S.C. 154(b) by 352 days.

(21) Appl. No.: 13/176,020

(22) Filed: Jul. 5, 2011

(65) Prior Publication Data

US 2012/0296752 A1    Nov. 22, 2012

Related U.S. Application Data

(60) Provisional application No. 61/488,744, filed on May 22, 2011.

(51) Int. Cl.
    *G06Q 30/00* (2012.01)
(52) U.S. Cl.
    USPC ....................................................... 705/26.1
(58) Field of Classification Search
    USPC ....................................................... 705/26.1
    See application file for complete search history.

(56) References Cited

U.S. PATENT DOCUMENTS

| | | |
|---|---|---|
| 6,285,989 B1 | 9/2001 | Shoham |
| 6,584,451 B1 | 6/2003 | Shoham et al. |
| 6,606,603 B1 | 8/2003 | Joseph et al. |
| 6,952,682 B1 | 10/2005 | Wellman |
| 7,072,061 B2 | 7/2006 | Blair et al. |
| 7,117,165 B1 | 10/2006 | Adams et al. |
| 7,130,815 B1 | 10/2006 | Gupta |
| 7,146,331 B1 | 12/2006 | Young |
| 7,152,043 B2 | 12/2006 | Alaia et al. |
| 7,225,145 B2 | 5/2007 | Whitley et al. |
| 7,225,152 B2 | 5/2007 | Atkinson et al. |
| 7,249,085 B1 | 7/2007 | Kinney, Jr. et al. |
| 7,283,979 B2 | 10/2007 | Tulloch et al. |
| 7,283,980 B2 | 10/2007 | Alaia et al. |
| 7,296,001 B1 | 11/2007 | Ephrati et al. |
| 7,346,574 B2 | 3/2008 | Smith et al. |
| 7,383,206 B2 | 6/2008 | Rupp et al. |
| 7,395,238 B2 | 7/2008 | Alaia et al. |
| 7,401,035 B1 | 7/2008 | Young |
| 7,444,299 B2 | 10/2008 | Smith et al. |
| 7,483,852 B2 | 1/2009 | Marhafer et al. |
| 7,499,876 B2 | 3/2009 | Rupp et al. |
| 7,536,362 B2 | 5/2009 | Starr et al. |
| 7,558,746 B2 | 7/2009 | Alaia et al. |
| 7,558,752 B1 | 7/2009 | Ephrati et al. |
| 7,571,137 B2 | 8/2009 | Alaia et al. |
| 7,599,878 B2 | 10/2009 | Atkinson et al. |
| 7,634,439 B1 | 12/2009 | Smith |
| 7,657,461 B2 | 2/2010 | Young |

(Continued)

*Primary Examiner* — Mila Airapetian
(74) *Attorney, Agent, or Firm* — Brian R. Short (57) ABSTRACT

Embodiments for maintaining a company profile of a company associated with a supplier/buyer commerce network are disclosed. One method includes collecting activity information of the company. The collecting includes monitoring a plurality of databases that each maintains activity information associated with the company, assigning a unique identification for the company across the plurality of databases, exporting the activity information associated with the company from each of the plurality of databases, and aggregating the activity information. The method further includes updating the company profile with the aggregated activity information of the company.

22 Claims, 6 Drawing Sheets

(56) References Cited

U.S. PATENT DOCUMENTS

| | | |
|---|---|---|
| 7,693,747 B2 | 4/2010 | Bryson et al. |
| 7,792,707 B2 | 9/2010 | Alaia et al. |
| 7,792,713 B1 | 9/2010 | Kinney, Jr. et al. |
| 7,813,966 B2 | 10/2010 | Alaia et al. |
| 7,835,957 B1 | 11/2010 | Kinney, Jr. |
| 7,840,476 B1 | 11/2010 | Zack et al. |
| 7,870,034 B2 | 1/2011 | Rupp et al. |
| 7,870,054 B2 | 1/2011 | Abeshouse et al. |
| 7,870,115 B2 | 1/2011 | Blair et al. |
| 7,921,053 B2 | 4/2011 | Kinney, Jr. et al. |
| 7,974,908 B1 | 7/2011 | Hommrich et al. |
| 8,086,518 B1 | 12/2011 | Maor |
| 8,095,451 B2 | 1/2012 | Smith et al. |
| 8,126,701 B2 | 2/2012 | Beck |
| 8,126,799 B2 | 2/2012 | Kellam et al. |
| 8,190,482 B1 | 5/2012 | Federighi et al. |
| 2005/0144046 A1 | 6/2005 | Schloss |
| 2007/0214060 A1 | 9/2007 | Whitley et al. |
| 2007/0239596 A1 | 10/2007 | Kinney, Jr. et al. |
| 2007/0299765 A1 | 12/2007 | Smith et al. |
| 2008/0027879 A1 | 1/2008 | Ephrati et al. |
| 2008/0065526 A1 | 3/2008 | Smith et al. |
| 2008/0071672 A1 | 3/2008 | Rupp et al. |
| 2008/0133377 A1 | 6/2008 | Alaia et al. |
| 2008/0133397 A1 | 6/2008 | Tulloch et al. |
| 2008/0133398 A1 | 6/2008 | Kinney et al. |
| 2008/0133399 A1 | 6/2008 | Rupp et al. |
| 2008/0147533 A1 | 6/2008 | Alaia et al. |
| 2008/0147534 A1 | 6/2008 | Ephrati et al. |
| 2008/0154763 A1 | 6/2008 | Alaia et al. |
| 2008/0162285 A1 | 7/2008 | Tulloch et al. |
| 2008/0162330 A1 | 7/2008 | Atkinson et al. |
| 2008/0162331 A1 | 7/2008 | Ephrati et al. |
| 2008/0162332 A1 | 7/2008 | Alaia et al. |
| 2008/0183509 A1 | 7/2008 | Schloss |
| 2008/0183614 A1 | 7/2008 | Gujral et al. |
| 2008/0201254 A1 | 8/2008 | Sharma et al. |
| 2008/0208616 A1 | 8/2008 | Young |
| 2008/0300959 A1 | 12/2008 | Sinha et al. |
| 2009/0099933 A1 | 4/2009 | Marhafer et al. |
| 2010/0017273 A1 | 1/2010 | Hommrich et al. |
| 2010/0179860 A1 * | 7/2010 | Noel et al. ............... 705/10 |
| 2011/0166951 A1 | 7/2011 | Abeshouse et al. |

* cited by examiner

MAINTENANCE OF A COMPANY PROFILE OF A COMPANY ASSOCIATED WITH A SUPPLIER/BUYER COMMERCE NETWORK

RELATED APPLICATIONS

This patent application claims priority to U.S. Provisional Patent Application No. 61/488,744 filed on May 22, 2011 which is herein incorporated by reference.

FIELD OF THE DESCRIBED EMBODIMENTS

The described embodiments relate generally to a supplier/buyer commerce network. More particularly, the described embodiments relate to a method, apparatus and system for adaptively updating a company profile of a company associated with a buyer/supplier commerce network.

BACKGROUND

Commerce networks provide a means for electronically connecting buyers and suppliers. Buyers can enhance their supplier network by being electronically connected to many different suppliers. As a result, a buyer may be able to obtain better pricing, and the suppliers may be able to realize additional sales.

However, buyers need a means by which to distinguish one supplier responding to a business opportunity from another supplier. That is, the buyers desire some form of guidance in the selection of a supplier. Additionally, buyers desire the ability to interact with references of suppliers for the purpose of additionally vetting the supplier.

Suppliers want to port their offline (brick-and-mortar) reputations and references online, and provide potential new customers with the ability to interact with those references.

Therefore, there is a need for a system, method and apparatus for providing a buyer with the ability to distinguish suppliers through additional guidance and references related to the suppliers. Additionally, there is a need for suppliers to provide additional information to potential buyers to improve the possibility of more buyers interacting with the supplier.

SUMMARY

An embodiment includes a computer-method of maintaining a company profile of a company associated with a supplier/buyer commerce network. The method includes collecting activity information of the company. The collecting includes monitoring a plurality of databases that each maintains activity information associated with the company, assigning a unique identification for the company across the plurality of databases, exporting the activity information associated with the company from each of the plurality of databases, and aggregating the activity information. The method further includes updating the company profile with the aggregated activity information of the company.

Another embodiment includes a computer-method of scoring a company based on a company profile of a supplier/buyer commerce network. The method includes maintaining the company profile based on at least one of aggregated activity information, community information, self-reported information and third party information. A score for the company is adaptively generated based on at least one of the aggregated activity information, the community information, the self-reported information and the third party information. The method further includes adaptively updating the aggregated activity information, including monitoring a plurality of databases that each maintain activity information associated with the company, assigning a unique identification for the company across the plurality of databases, exporting the activity information associated with the company from each of the plurality of databases, and aggregating the activity information. The company profile is updated with the aggregated activity information of the company.

Another embodiment includes a program storage device readable by a machine, tangibly embodying a program of instructions executable by the machine to perform a computer-method of maintaining a company profile of a company associated with a supplier/buyer commerce network. When executed, the computer-method collects activity information of the company, including monitoring a plurality of databases that each maintains activity information associated with the company, assigning a unique identification for the company across the plurality of databases, exporting the activity information associated with the company from each of the plurality of databases, and aggregating the activity information. The company profile is updated with the aggregated activity information of the company.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, systems and apparatuses for maintaining a company profile of a company associated with a supplier/buyer commerce network. Additionally, the embodiments described include methods, systems and apparatuses of scoring a company based on the company profile of the company. The company profile includes information about the company derived from a variety of sources associated with the supplier/buyer commerce network.

Figure 1:
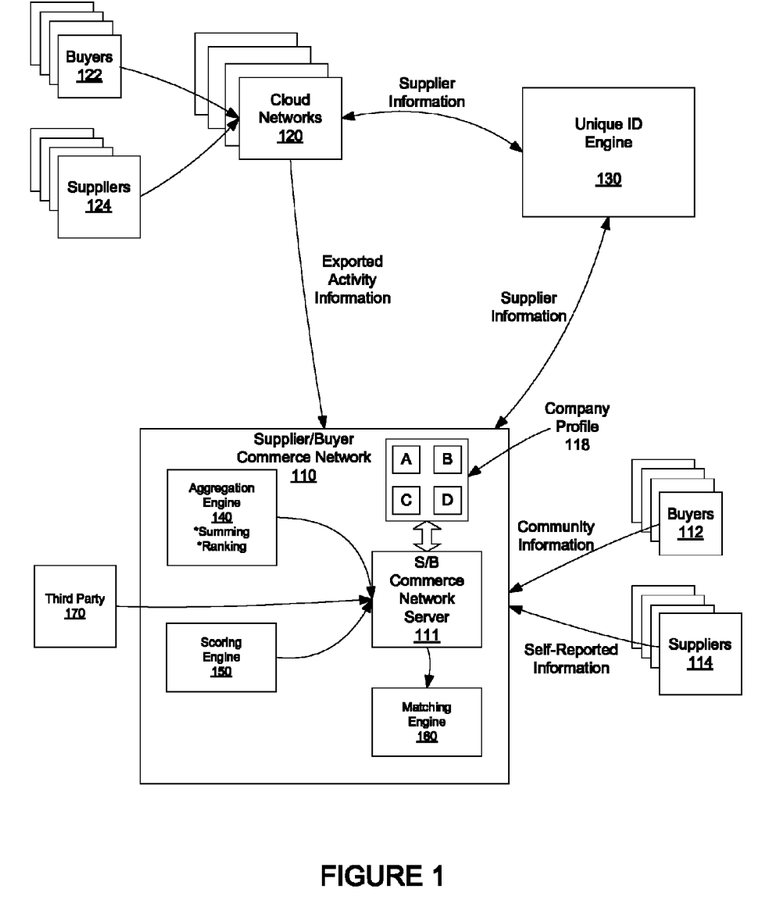
FIG. 1 shows an example of a system that facilitates a supplier/buyer commerce network maintaining a company profile.

FIG. 1 shows an example of a system that facilitates a supplier/buyer commerce network 110 maintaining a company profile 118. Embodiments include the company profile 118 being adaptively updated (by, for example, a commerce network server 111) as the company associated with the company profile 118 interacts with buyers 112, 122 and/or suppliers 114, 124. The company profile 118 can advantageously be used to generate a score for the company and/or match the company with other companies associated with the supplier/buyer commerce network 110. The company profile 118 is generally stored within a database associated with the supplier/buyer commerce network 110.

While the embodiments described are directed to a single company profile 118, it is to be understood that at least some of the described embodiments include multiple company profiles. For embodiments, each company profile corresponds with a different company associated with the supplier/buyer commerce network 110. The different company profiles provide a means for contrasting (for example, scoring) the different companies. Additionally, the different company profiles can be used to proactively match companies (suppliers 114 and buyers 112) associated with the supplier/buyer commerce network 110.

As shown, an embodiment of the company profile 118 includes four quadrants, wherein a first quadrant (A) includes self-reported information, a second quadrant (B) includes community information, a third quadrant (C) includes third party information, and fourth quadrant (D) includes aggregated activity information. It is to be understood that for some embodiments the company profile can include a subset of these quadrants, and for other embodiments, the company profile can include information in addition to the information of these four quadrants. The company profile 118 is a collection of information pertaining to the corresponding company that is associated with the network. The company profile allows other companies (suppliers 114 and/or buyers 112) to evaluate the company associated with the company profile 118. Clearly, the company profile can include fewer or more than the four quadrants.

The self-reported information (quadrant A) can be from (suppliers 114 and/or buyers 112) includes company provided information that can be received by the supplier/buyer commerce network and incorporated into the company profile. The self-reported information can be received in different ways. For example, a company may effectively "walk up" and join the supplier/buyer commerce network, or the company information can be loaded by the supplier/buyer commerce network 110 or from another database or application. The self-reported information can include both public information, as well as private information (for example, credit card and/or personal information). For an embodiment, the public information becomes a part of the profile.

For embodiments, pieces of the self-reported information are used to drive additional processes in the supplier/buyer commerce network. That is, for example the self-reported information can include a DUNS number field. Once the supplier/buyer commerce network has the DUNS number, the supplier/buyer commerce network can provide financial risk score information on the supplier. The DUNS number can be used to drive communication with, for example, a third party. Additionally, as will be described, a matching process engine 160 can analyze commodities (goods & services) a supplier has selected as providing, and the sales territories of the supplier, in order to match that supplier's profile against the business opportunities.

The community information (quadrant B) includes information that pertains to the company that is provided by suppliers 114 and buyers 112 associated with the network. The community information includes, for example, ratings. The ratings allow, for example, a buyer to rate any supplier that has responded to a business opportunity on the supplier/buyer commerce network 110. For an embodiment, the supplier/buyer commerce network members are allowed to rate, for example, on five different components.

A first example of a rating component includes an overall rating. The overall rating quantifies a buyer or suppliers overall rating of the company. It is not an average of the other ratings, but one that is assigned overall, all things considered.

A second example of a rating component includes communication. This rating criteria documents whether the company is responsive and thorough in questions and responses.

A third example of a rating component includes credibility. This rating component characterizes the trustworthiness, honesty and perceived reputation of the supplier.

A fourth example of a rating component includes reliability. This rating component assesses the companies' reliability, which represents the ability or perception that the supplier performs in a timely and accurate manner.

A fifth rating component includes quality. This rating component distinguishes the companies' understanding of needs and the ability to apply the understanding in a professional and valuable manner.

The ratings are generated by other users on the system. That is, for example, buyers leave ratings for suppliers, and suppliers leave ratings for buyers. Embodiments include using the five listed rating component, subsets of the five listed rating components, and/or additional rating components.

Another aspect of the community information includes references. For example, a supplier may request a buyer to leave a reference for the supplier. For embodiments, the supplier solicits the reference by supplying the email address of the buyer, or otherwise identifies the buyer. To further facilitate community and parallel real world interactions, embodiments of the supplier/buyer commerce network allows other buyers to request contact with the author of any given reference. For embodiments, the subject of the reference (the supplier) is the gatekeeper in such an interaction and may decline or accept the third party's request to speak with a reference. For embodiments, the reference itself contains a few pieces of information, for example, a text narrative, industry of the buyer, and/or length of the business relationship.

The third party information (quadrant C) includes information that pertains to the company that is provided by a third party 170 who is typically not associated directly with the network. The third party information includes, for example, a business and credit rating provided by, for example, an established rating agency (such as, Dun & Bradstreet® (D&B)). The third party information can include financial risk information about suppliers. This can be provided, for example, using self-reported DUNS number information. The DUNS information can be validated with D&B using an API call. The validated information can be displayed back to the supplier for their approval. Once approved, the supplier/buyer commerce network basically has the supplier linked to a risk profile on D&B.

The aggregated activity information includes, for example, transactional activity of the company. The aggregated activity information includes information about suppliers and their performance on the supplier/buyer commerce network 110.

A useful piece of aggregated activity information included within the company profile is the number of transacting relationships that the company has with buyers/suppliers 112, 114 on the supplier/buyer commerce network 110, and/or transacting relationships the company has with buyers/suppliers 122, 124 of other commerce networks, such as cloud networks 120. This information provides a valuable picture of how many other companies the company is actively doing business with via the supplier/buyer commerce network 110, and the cloud networks 120. It is to be understood that doing business with other companies includes activities can include interactions that do not include money, good or services changing hands. If the supplier/buyer commerce network 110 is interfaced with cloud networks 120, the company profile can be made to be common (the same) between commerce network platforms. Therefore, real-time information can be utilized across the commerce and cloud network platforms 110, 120.

Examples of aggregated activity information include, but are not limited to, event invitations, invitations by revenue, transaction awards (for example, winning supplier bids), revenue ranges, and/or top bids by industry. The follow are examples of such aggregated activity information:
Total Event Invitations: 34
Invitations from Buyers by Industry:
Agriculture: 10
Retail: 12
Technology: 12
Total Bids Invitations: 34
Invitations from Buyers by Revenue Range:
$1-5M: 10
$5-10M: 12
Over $10M: 12
Total Sourcing Project Awards: 34
Awards from Buyers by Industry:
Retail: 22
Technology: 12
Total Sourcing Project Awards: 34
Awards from Buyers by Revenue Range:
$1-5M: 10
$5-10M: 12
Over $10M: 12
Total Bids in Past Year: $1000000
Number of Times Bid was in Top 3: 34
Top 3 Bids by Revenue Range:
$1-5M: 10
$5-10M: 12
Over $10M: 12
Number of Times Bid was in Top 3: 34
Top 3 Bids by Industry:
Agriculture: 10
Retail: 12
Technology: 12

The interface between the supplier/buyer commerce network 110 and cloud networks 120 allows the supplier/buyer commerce network 110 to glean additional information that can be useful for enhancing the value of the company profile 118. For example, cloud network 120 can include sourcing and/or contract information and data. These embodiments determine commonality of suppliers/buyers across multiple private cloud networks. The different companies (buyer/sellers) are assigned unique identifiers by, for example, a unique ID engine 130, which allows the generation of a single view of the companies' behavior across multiple interactions (across the supplier/buyer commerce network 110 and the cloud networks 120). That is, for embodiments, one or more databases are associated with networks 110, 120 that maintain transactional activity of the company with other companies, and this transaction information for the company is identified by the unique identifier of the company. The unique ID engine 130 can be operable, for example, on a server that is networked to the supplier/buyer commerce network 110.

Once the company has been assigned a unique identification by the unique ID engine 130, the supplier/buyer commerce network 110 imports (alternatively, the databases of the cloud networks 120 export) the activity information of the company from the databases of the cloud networks 120.

While the unique ID engine 130 is shown as being separate from the supplier/buyer commerce network 110 in FIG. 1, it is to be understood that for other embodiments the unique ID engine 130 is included within the supplier/buyer network 110.

The activity information from the databases of the cloud networks 120 is aggregated by an aggregation engine 140. For embodiments, the aggregation includes summing or ranking the activity information. For embodiments, the aggregation engine 140 can be a computer or server that is a part of, or is connected to the supplier/buyer commerce network 110.

The company profile 118 that includes at least one or more of the four quadrants of information ((A) self-reported information, (B) community information, (C) third party information, and (D) aggregated activity information) can be further processed by a scoring engine 150 that scores companies associated with the supplier/commerce network 110, and/or by a matching engine 160 that matches the company with buyers 112 or sellers 114 associated with the supplier/commerce network 110. For embodiments, the scoring engine 150 and the matching engine 160 can be computers or servers that are a part of, or are connected to the supplier/buyer commerce network 110.

The supplier/buyer commerce network 110, the cloud networks 120 and the unique ID engine 130 can each be implemented with one or more servers or computers (such as, a supplier/buyer commerce server, cloud network servers and a unique ID engine server). Additionally, the aggregation engine 140, the scoring engine 150 and the matching engine 160 can be each implemented with one or more servers, or they can all be implemented with a single server. Each of the supplier/buyer commerce network 110, the cloud networks 120 and the unique ID engine 130 can be interconnected through, for example, the internet or any other type of network. Additionally, the buyers 112, the sellers 114 and the third party 170 can be connected to the supplier/buyer commerce network 110 through, for example, the internet or any other type of network.

Figure 2:
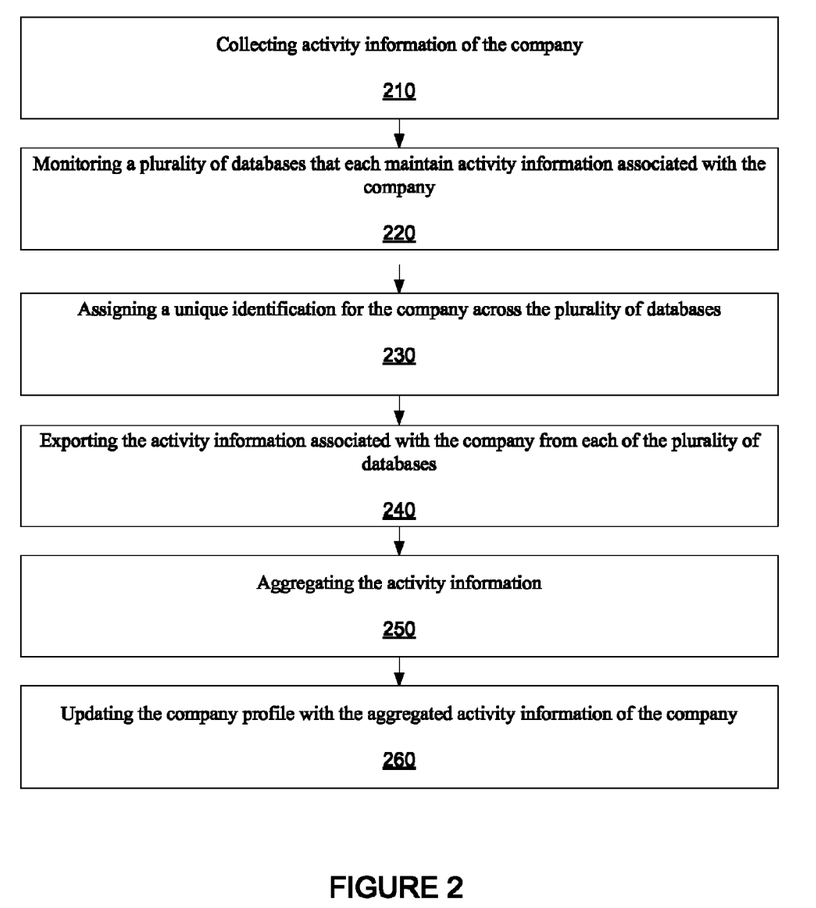
FIG. 2 is a flow chart that includes steps of an example of a method of maintaining a company profile of a company associated with a supplier/buyer commerce network

FIG. 2 is a flow chart that includes steps of an example of a method of maintaining a company profile of a company associated with a supplier/buyer commerce network. A step 210 includes collecting activity information of the company, comprising. The collecting of activity information includes a step 220 that includes monitoring a plurality of databases that each maintain activity information associated with the company, a step 230 that includes assigning a unique identification for the company across the plurality of databases, a step 240 that includes exporting the activity information associated with the company from each of the plurality of databases, and a step 250 that includes aggregating the activity information. Finally, a step 260 includes updating the company profile with the aggregated activity information of the company. Embodiments include the supplier/buyer commerce network sharing the company profile with users of the supplier/buyer commerce network.

Figure 3:
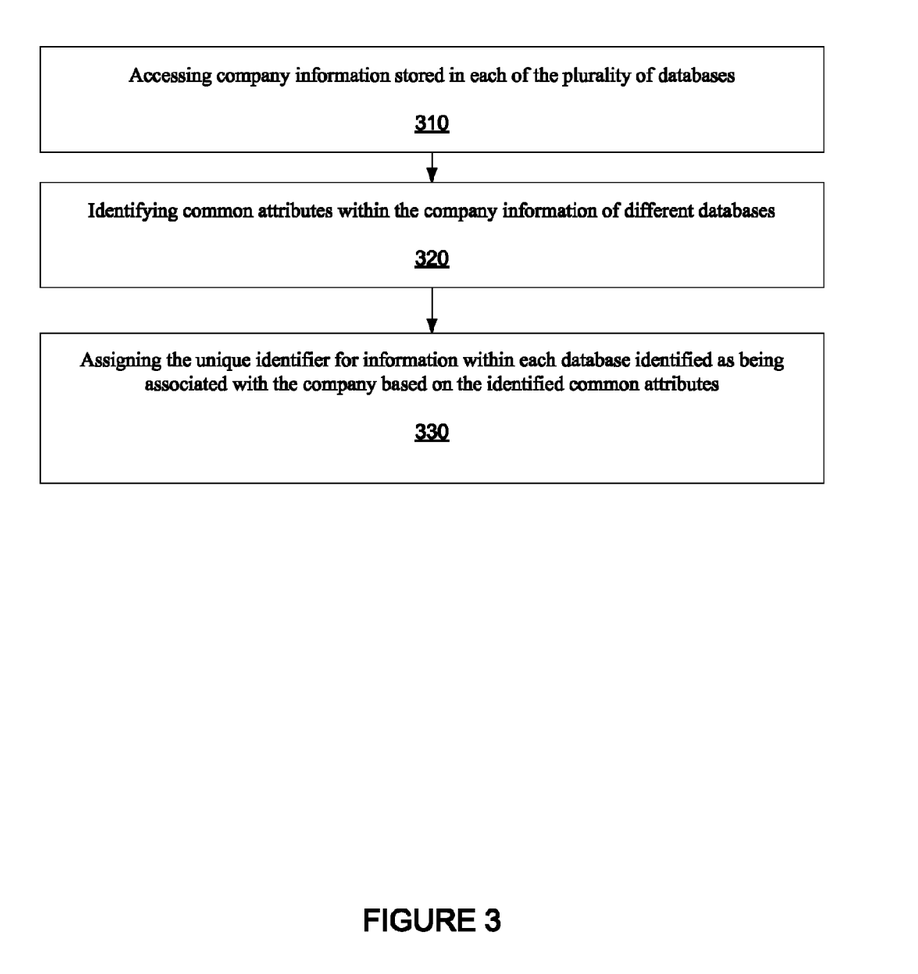
FIG. 3 is a flow chart that includes steps of an example of a method of assigning a unique identifier for the company.

FIG. 3 is a flow chart that includes steps of an example of a method of assigning a unique identifier for the company. A first step 310 includes accessing company information stored in each of the plurality of databases. A second step 320 includes identifying common attributes within the company information of different databases. A third step 330 includes assigning the unique identifier for information within each database identified as being associated with the company based on the identified common attributes.

An embodiment aggregating the current activity information includes summing the activity information of the company. Another embodiment of aggregating the activity information includes a ranking of multiple companies.

Figure 4:
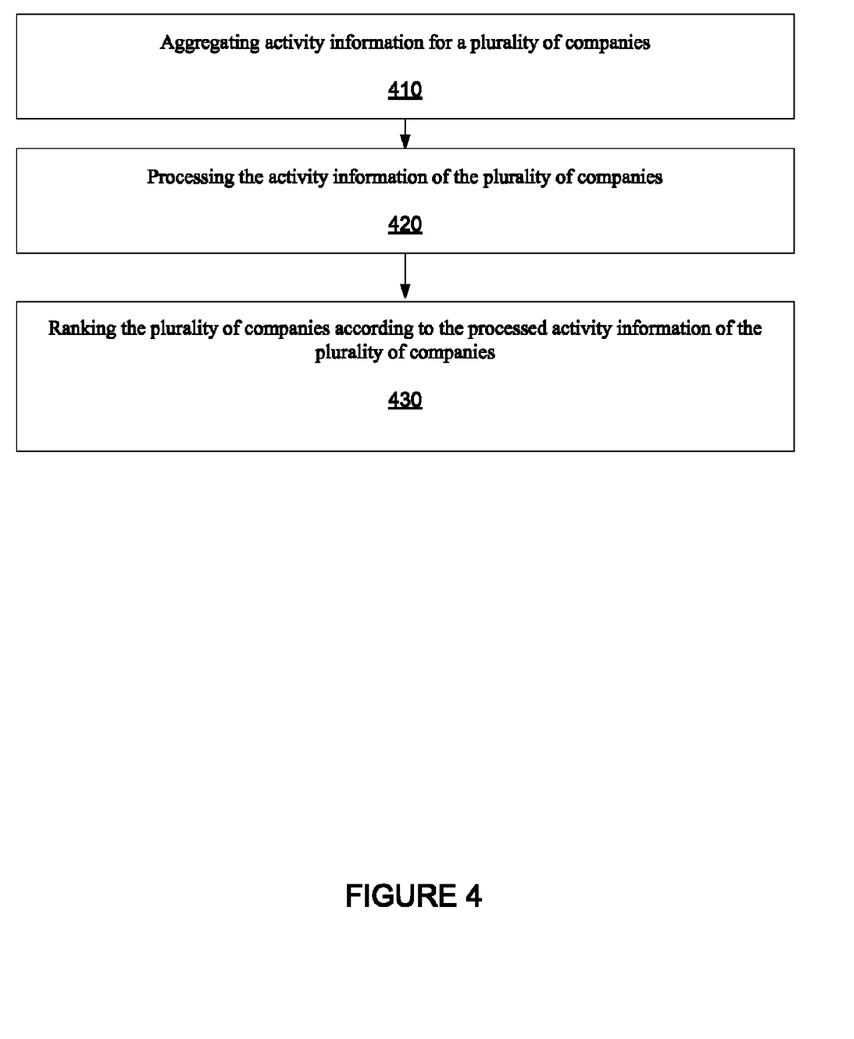
FIG. 4 is a flow chart that includes steps of an example of a method aggregating the activity information.

FIG. 4 is a flow chart that includes steps of an example of a method aggregating the activity information. A first step 410 includes aggregating activity information for a plurality of companies. A second step 420 includes processing the activity information of the plurality of companies. For embodiments, the processing of the activity information includes aggregating total transaction amounts or ranking the supplier based on competitiveness of their bids. A third step 430 includes ranking the plurality of companies according to the processed activity information of the plurality of companies.

For an embodiment, each of the plurality of companies is ranked by numbers of invitations to interact received by each of the plurality of companies. For another embodiment, each of the plurality of companies is ranked by numbers of completed interactions of each of the plurality of companies. For another embodiment, each of the plurality of companies is ranked by a size of interactions of each of the plurality of companies.

As previously described, an embodiment of the company profile includes community information. The community information includes information that pertains to the company that is provided by buyers and/or suppliers associated with the supplier/buyer commerce network, wherein the received information is related to the company. The supplier/buyer commerce network additionally incorporates the community information into the company profile.

As previously described, an embodiment of the company profile includes third party information. The third party information includes information retrieved or received from third parties. The supplier/buyer commerce network additionally incorporates the third party information into the company profile.

Embodiments of the supplier/buyer commerce network generate a score for the company based on the aggregated activity information and at least one of the community information, self-reported information and third party information. The score provides other companies (buyers/suppliers) with an indicator who to work with and who to avoid or look at with more scrutiny. A numeric score can be mathematically determined a to enable users (buyer or supplier companies) to judge one supplier against another using a single metric. The score is only possible, useful and meaningful when combining many, many facets of information. Therefore the usefulness of the score is dependent upon the ability to gather data from the quadrants (A, B, C, D) effectively, and from there to create this derivative score.

Embodiments include generating an overall score for a company. This score is a derivative of all the information about the company that is available. Calculating the score includes taking into account whether a supplier has information available in each of the quadrants. The score is additionally dependent on how much information is available. A unique formula can be used to calculate the score based on the available company information. For embodiments, the score is not just a formula of information available, but also assigns value to the presence or absence of information.

For embodiments, the score formulae changes over time, especially as new information facets (data sources connected to the supplier/buyer commerce network) become available. The formulae may be dynamic in some cases, such that if a supplier does not have information type X available, the formula might then look for a similar type of information or use a slightly different formula to calculate the value. In essence, a score or indicator can be provided based on available information. The scores can be dynamic in that they may be presented relative to others in the same category or industry. That is, a curve could provide some sort of segmentation.

For an embodiment, the score is adaptively dependent upon each of the aggregated activity information, the community information, self-reported information and third party information depending on how much information is included within each of the aggregated activity information, the community information, self-reported information and third party information.

For an embodiment, the score is adaptively dependent upon each of the aggregated activity information, the community information, self-reported information and third party information depending on how recently information included within each of the aggregated activity information, the community information, self-reported information and third party information is updated.

For an embodiment, the score is based on adaptive weighting of the aggregated activity information, the community information, self-reported information and third party information, wherein the weighting is dependent upon characteristics of one or more industries that the company is associated with.

For an embodiment, the score generated by the supplier/buyer commerce network is shared or made available to users of the supplier/buyer commerce network.

The company profile can additionally be used to match the company with buyers or sellers associated with the supplier/buyer commerce network based on the company profile. That is the company profile can be used to proactively connect the company with buyers or sellers associated with the supplier/buyer commerce network based at least in part on the company profile.

Figure 5:
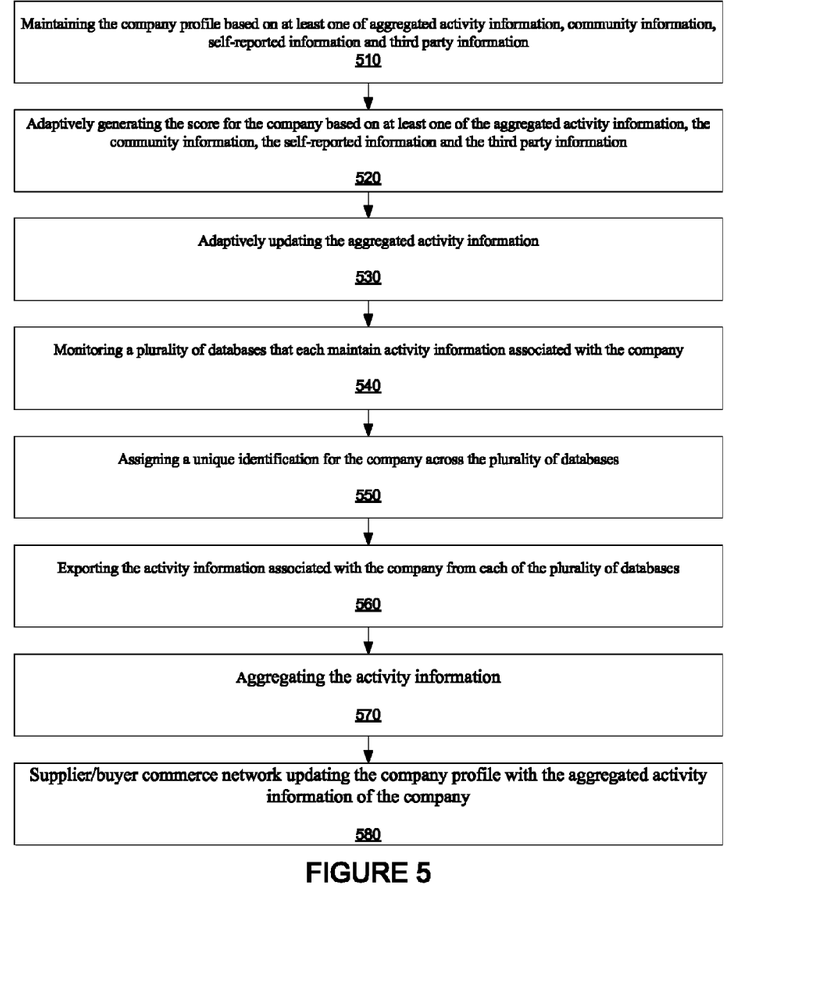
FIG. 5 is a flow chart that includes steps of an example of a method of scoring a company based on a company profile of a supplier/buyer commerce network.

FIG. 5 is a flow chart that includes steps of an example of a method of scoring a company based on a company profile of a supplier/buyer commerce network. This embodiment provides for scoring of a company associated with the supplier/buyer commerce network when the company has just joined the supplier/buyer commerce network and the supplier/buyer commerce network does not have much if any information about the company. A step 510 includes maintaining the company profile based on at least one of aggregated activity information, community information, self-reported information and third party information. If the company has just joined the supplier/buyer commerce network, this can include some introductory self-reported information.

As time goes on, and the company interacts with buyers and/or suppliers of the supplier/buyer commerce network, the score is adaptively updated. A step 520 includes adaptively generating the score for the company based on at least one of the aggregated activity information, the community information, the self-reported information and the third party information. A step 530 includes adaptively updating the aggregated activity information, including a step 540 that includes monitoring a plurality of databases that each maintain activity information associated with the company, a step 550 that includes assigning a unique identification for the company across the plurality of databases, a step 560 that includes exporting the activity information associated with the company from each of the plurality of databases, and a step 570 that includes aggregating the activity information. A step 580 includes the supplier/buyer commerce network updating the company profile with the aggregated activity information of the company.

Figure 6:
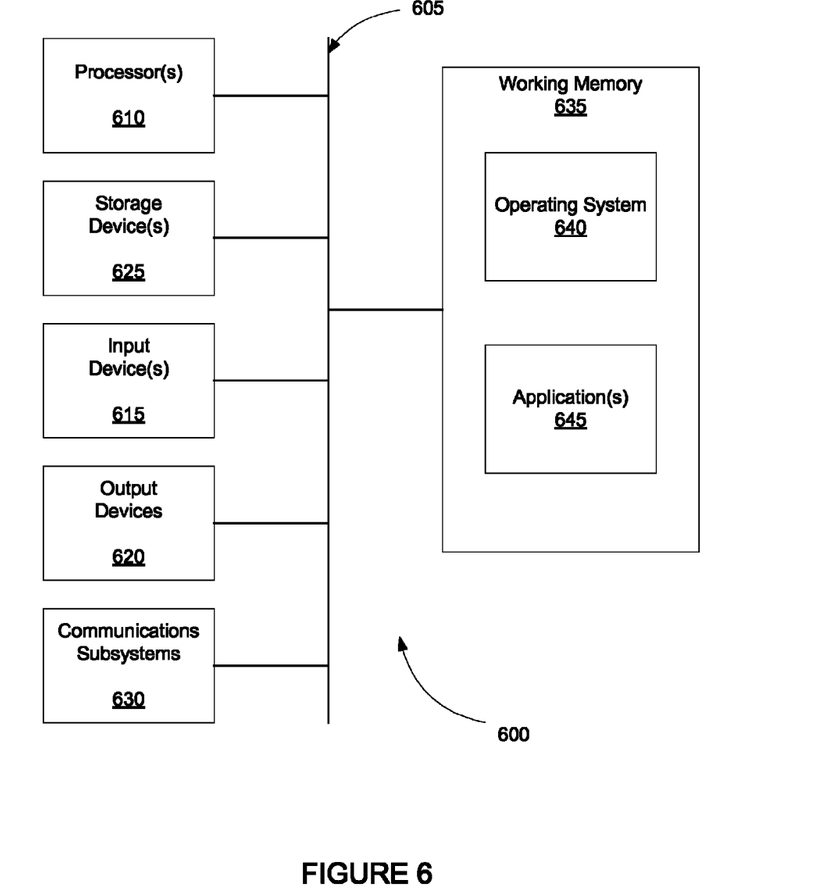
FIG. 6 shows a schematic illustration of one embodiment of a computer system that can perform the methods of the described embodiment, and/or can function as, for example, a supplier/buyer commerce network that maintains a company profile of a company associated with the supplier/buyer commerce network.

FIG. 6 shows a schematic illustration of one embodiment of a computer system that can perform the methods of the described embodiment, and/or can function as, for example, a supplier/buyer commerce network that maintains a company profile of a company associated with the supplier/buyer commerce network. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, communication subsystems 630, one or more input devices 615, which can include without limitation a mouse, a keyboard and/or the like; and one or more output devices 620, which can include without limitation a display device, a printer and/or the like. The computer system 600 may further include (and/or be in communication with) one or more storage devices 625. The computer system 600 also can comprise software elements, shown as being located within the working memory 635, including an operating system 640 and/or other code, such as one or more application programs 645, which may comprise computer programs of the described embodiments, and/or may be designed to implement methods of the described embodiments and/or configure systems of the embodiments as described herein.

Another embodiment includes a program storage device readable by a machine (of the supplier/buyer commerce network), tangibly embodying a program of instructions executable by the machine to perform a method of maintaining a company profile of a company associated with a supplier/buyer commerce network. The method performed includes collecting activity information of the company. The collecting activity information of the company includes monitoring a plurality of databases that each maintains activity information associated with the company, assigning a unique identification for the company across the plurality of databases, exporting the activity information associated with the company from each of the plurality of databases and aggregating the activity information. The method further includes updating the company profile with the aggregated activity information of the company.

Although specific embodiments have been described and illustrated, the embodiments are not to be limited to the specific forms or arrangements of parts so described and illustrated.

What is claimed:

1. A computer-method of maintaining a company profile of a company associated with a supplier/buyer commerce network, comprising:
   collecting activity information of the company, wherein collecting the activity information of the company comprises:
      monitoring a plurality of databases that each maintain activity information associated with the company, wherein the activity information includes transacting relationships that the company has with buyers or suppliers;
      assigning a unique identification for the company across the plurality of databases;
      exporting the activity information associated with the company from each of the plurality of databases based on the unique identification;
      aggregating the activity information exported from the plurality of databases; and
   wherein maintaining the company profile of the company further comprises updating the company profile with the aggregated activity information of the company.

2. The method of claim 1, wherein at least one of the plurality of databases, is associated with a network that maintains transactional activity of the company with other companies.

3. The method of claim 1, wherein assigning a unique identifier for the company comprises:
   accessing company information stored in each of the plurality of databases;
   identifying common attributes within the company information of different databases;
   assigning the unique identifier for information within each database identified as being associated with the company based on the identified common attributes.

4. The method of claim 1, wherein aggregating the current activity information comprises summing the activity information of the company.

5. The method of claim 1, wherein aggregating the activity information comprises:
   aggregating activity information for a plurality of companies;
   processing the activity information of the plurality of companies;
   ranking the plurality of companies according to the processed activity information of the plurality of companies.

6. The method of claim 5, wherein each of the plurality of companies is ranked by numbers of invitations to interact received by each of the plurality of companies.

7. The method of claim 5, wherein each of the plurality of companies is ranked by numbers of completed interactions of each of the plurality of companies.

8. The method of claim 5, wherein each of the plurality of companies is ranked by a size of interactions of each of the plurality of companies.

9. The method of claim 1, further comprising receiving and incorporating company provided information into the company profile.

10. The method of claim 1, further comprising receiving information from buyers and/or suppliers associated with the supplier/buyer commerce network, wherein the received information is related to the company and additionally incorporating this information into the company profile.

11. The method of claim 1, further comprising retrieving/receiving third party information about the seller and additionally incorporating the third party information into the company profile.

12. The method of claim 1, further comprising sharing the company profile with users of the supplier/buyer commerce network.

13. The method of claim 1, wherein the company profile further comprises at least one of community information, self-reported information and third party information, and further comprising generating a score for the company based on the aggregated activity information and at least one of the community information, self-reported information and third party information.

14. The method of claim 13, wherein the score is adaptively dependent upon each of the aggregated activity information, the community information, self-reported information and third party information depending on how much information is included within each of the aggregated activity information, the community information, self-reported information and third party information.

15. The method of claim 13, wherein the score is adaptively dependent upon each of the aggregated activity information, the community information, self-reported information and third party information depending on how recently information included within each of the aggregated activity information, the community information, self-reported information and third party information is updated.

16. The method of claim 13, wherein the score is based on adaptive weighting of the aggregated activity information, the community information, self-reported information and third party information, wherein the weighting is dependent upon characteristics of one or more industries that the company is associated with.

17. The method of claim 13, further comprising sharing the score or making the score available to users of the supplier/buyer commerce network.

18. The method of claim 1, further comprising matching the company with buyers or sellers associated with the supplier/buyer commerce network based on the company profile.

19. The method of claim 18, further comprising proactively connecting the company with buyers or sellers associated with the supplier/buyer commerce network based at least in part on the company profile.

20. A computer-method of scoring a company based on a company profile of a supplier/buyer commerce network, comprising:
  maintaining the company profile based on at least one of aggregated activity information, community information, self-reported information and third party information;
  adaptively generating a score for the company based on at least one of the aggregated activity information, the community information, the self-reported information and the third party information;
  adaptively updating the aggregated activity information, wherein updating the aggregated the activity information of the company comprises:
    monitoring a plurality of databases that each maintain activity information associated with the company, wherein the activity information includes transacting relationships that the company has with buyers or suppliers;
    assigning a unique identification for the company across the plurality of databases;
    exporting the activity information associated with the company from each of the plurality of databases based on the unique identification;
    aggregating the activity information exported from the plurality of databases;
  updating the company profile with the aggregated activity information of the company.

21. An enterprise application system that maintains a company profile of a company associated with a supplier/buyer commerce network, comprising:
  a supplier/buyer server operative to collect activity information of the company, wherein the supplier/buyer being operative to collect the activity information of the company comprises:
    the supplier/buyer server operative to monitor a plurality of databases that each maintain activity information associated with the company, wherein the activity information includes transacting relationships that the company has with buyers or suppliers;
    an ID engine operative to assign a unique identification for the company across the plurality of databases;
    the supplier/buyer server operative to export the activity information associated with the company from each of the plurality of databases based on the unique identification;
    the supplier/buyer server operative to aggregate the activity information exported from the plurality of database;
  the supplier/buyer server operative to update the company profile with the aggregated activity information of the company.

22. A program storage device readable by a machine, tangibly embodying a program of instructions executable by the machine to perform maintaining a company profile of a company associated with a supplier/buyer commerce network, comprising:
  collecting activity information of the company, wherein collecting the activity information of the company comprises:
    monitoring a plurality of databases that each maintain activity information associated with the company, wherein the activity information includes transacting relationships that the company has with buyers or suppliers;
    assigning a unique identification for the company across the plurality of databases;
    exporting the activity information associated with the company from each of the plurality of databases based on the unique identification;
    aggregating the activity information exported from the plurality of database;
  updating the company profile with the aggregated activity information of the company.

* * * * *